United States Patent

Whorlow et al.

[11] Patent Number: 5,959,456
[45] Date of Patent: Sep. 28, 1999

[54] TRANSDUCER FOR PROVIDING DISTANCE INFORMATION ABOUT A TARGET RELATIVE TO A TRANSDUCER

[75] Inventors: Raymond John Whorlow, Sussex; Bhalchandra Vinayak Jayawant, East Sussex, both of United Kingdom

[73] Assignee: British Nuclear Fuels plc, Warrington, United Kingdom

[21] Appl. No.: 08/817,932

[22] PCT Filed: Nov. 1, 1995

[86] PCT No.: PCT/GB95/02560

§ 371 Date: May 30, 1997

§ 102(e) Date: May 30, 1997

[87] PCT Pub. No.: WO96/14554

PCT Pub. Date: May 17, 1996

[30] Foreign Application Priority Data

Nov. 7, 1994 [GB] United Kingdom .................. 9422418

[51] Int. Cl.$^6$ ..................................................... G01R 27/26
[52] U.S. Cl. ........................................... 324/662; 324/671
[58] Field of Search .................................. 324/660, 661, 324/662, 671, 672, 674, 667

[56] References Cited

U.S. PATENT DOCUMENTS

| | | |
|---|---|---|
| 3,924,177 | 12/1975 | Lemineur et al. . |
| 5,140,274 | 8/1992 | Wertz ........................................ 324/671 |
| 5,394,969 | 3/1995 | Harbaugh ................................. 324/672 |
| 5,602,486 | 2/1997 | Novak ....................................... 324/671 |

FOREIGN PATENT DOCUMENTS

| | | |
|---|---|---|
| 1183974 | 6/1967 | United Kingdom . |
| 1577135 | 3/1976 | United Kingdom . |

*Primary Examiner*—Maura Regan
*Attorney, Agent, or Firm*—Nixon & Vanderhye P.C.

[57] ABSTRACT

A transducer is disclosed which provides distance or position information about a target relative to the transducer. The transducer has first resistor and a first electrode for forming a first capacitive coupling with a target, a second resistor and a second electrode for forming a second capacitive coupling with the target. Signals of opposite phase or polarity are applied to the respective resistor electrode combinations. By applying signals of opposite phase or polarity, no net signal is applied to the target, thereby avoiding problems with cross talk between adjacent transducers.

19 Claims, 3 Drawing Sheets

TRANSDUCER FOR PROVIDING DISTANCE INFORMATION ABOUT A TARGET RELATIVE TO A TRANSDUCER

BACKGROUND OF THE INVENTION

1. Field of the Invention

This invention relates to transducers, and in particular to a capacitance transducer for providing distance or position information about a target relative to the transducer.

1. Discussion of Prior Art

Typically, a capacitance position transducer is used to provide information about the position (or proximity) of an object (or target) relative to the transducer. A conventional transducer includes a single electrode plate for forming a capacitive coupling with the target. The amount of capacitive coupling is inversely proportional to the distance between the electrode plate and the target. The capacitance, and hence the distance, can be detected by means of an oscillator whose frequency is dependent on the capacitance value.

A typical oscillator circuit 1 is shown in FIG. 1 of the accompanying drawings. The electrode plate 3 is coupled to the inverting input of an operational amplifier 5. Negative feedback is provided via a first resistor 7. The positive input of the operational amplifier 5 is fed by a potential divider formed by two resistors 9,11 coupled in series across the output of the amplifier 5.

The transducer operates because the target (not shown) is substantially earthed, or is coupled relative to earth. The transducer effectively responds to the relatively small capacitance between the electrode plate 3 and the target, in series with the capacitance of the target to earth.

With reference to FIG. 2, a problem can arise if more than one such transducer 1 is used in conjunction with a single target 13, for example, to measure the distances between the transducers 1 and the target 13 around the target 13. The problem is caused by cross talk between the individual transducer capacitor signals. Further, if $C_T$ represents a typical value of each transducer capacitance, and $C_E$ represents the target to earth capacitance, then for less than 1% cross talk the value of $C_E$ must be at least one hundred times the value of $C_T$; even this factor may not be sufficient in practice.

SUMMARY OF THE INVENTION

The present invention has been devised to overcome problems associated with the use of more than one capacitance transducer with a single target.

Accordingly, the present invention provides a transducer for providing distance or position information about a target relative to the transducer, the transducer comprising a first resistor and a first electrode for forming a first capacitive coupling with a target, a second resistor and a second electrode for forming a second capacitive coupling with the target, means for applying signals of opposite phase or of opposite polarity to the respective resistor and electrode combinations and processing means for processing the voltages appearing across the electrodes to produce an output indicative of the distance or position of the target relative to the transducer.

When applying signals of opposite phase or of opposite polarity, no net signal is applied to the target. Problems associated with cross talk are, therefore, avoided, which is a marked improvement over the prior art transducer mentioned above. Further, a secondary advantage is provided in that common mode rejection occurs causing the circuit to ignore any signal on the target.

Preferably the processing means combine the voltages appearing on the two electrodes to produce an output indicative of the distance or position of the target from the transducer. Other ways of processing the voltages appearing across the electrodes may, of course, alternatively be used.

The means for applying signals preferably comprise an oscillator for producing equal and opposite waveforms to be applied to the respective first and second resistor and electrode combinations.

Preferably a head of the transducer carries the first and second electrodes in a first plane and a tail of the transducer substantially perpendicular to the first plane is adapted to connect the transducer to a power source.

The processing means may be mounted in the head of the transducer. Further, the processing means may be formed on a printed circuit board mounted in the head of the transducer behind the first and second electrodes. Capacitance between the circuitry of the processing means and the electrodes may be minimised by, for example, making the plane of the circuitry (e.g. the p.c.b.) substantially perpendicular to the plane of the electrodes.

Preferably the head of the transducer tapers from a wide end carrying the electrodes to a narrow end connected to the tail of the transducer.

The first and second electrodes are preferably substantially rectangular and mounted in an insulator on an exposed surface of the transducer.

Guard rings may be provided arqund the electrodes to guard the electrodes from any stray signals. More particularly, the guard rings are included to cancel the effect of capacitance to earth inside the body of the transducer, thus increasing sensitivity to earth outside. Further, the connections to the electrodes from the signal application means and from the electrodes to the processing means may also be shielded.

The head of the transducer is preferably made of a conductive material, such as steel or aluminium. The electrodes themselves are preferably made from copper or brass. Any other appropriate materials can, of course, alternatively be used.

The head of the transducer preferably comprises a body and a cap, the cap being removable to facilitate access to the processing means within the head. General assembly of the transducer will also be simplified.

The electrodes may present a curved face for interacting with a correspondingly curved target. In such an arrangement, the target may be a rotating cylinder, the electrodes being arranged to lie in a line substantially parallel to the axis of the cylinder.

In another aspect of the present invention, there is provided an apparatus comprising a rotor, a stator for driving the rotor and a plurality of electromagnets for supporting the rotor relative to the stator, wherein at least one transducer as herein claimed is included for providing information on the position of the rotor relative to the stator.

In a preferred arrangement, the rotor is cylindrical and rotates around the stator. In such an arrangement, the transducer or transducers may be positioned between poles of the electromagnets or poles of the stator.

BRIEF DESCRIPTION OF THE DRAWINGS

Specific embodiments of the present invention are now described, by way of example only, with reference to the accompanying drawings, in which.

DETAILED DISCUSSION OF PREFERRED EMBODIMENTS

Figure 1:
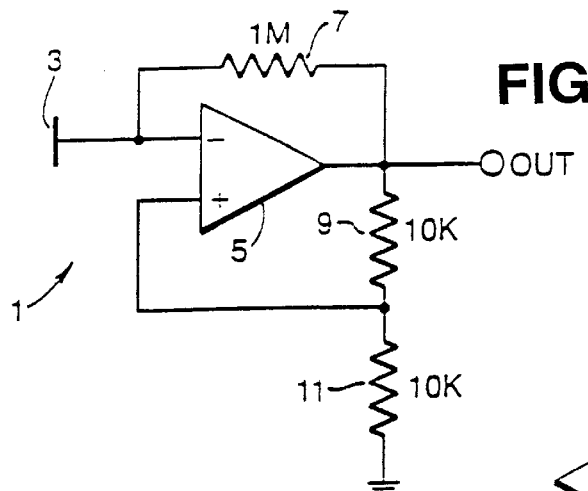
FIG. 1 is a simple example of a prior art transducer circuit as described above.
Figure 2:
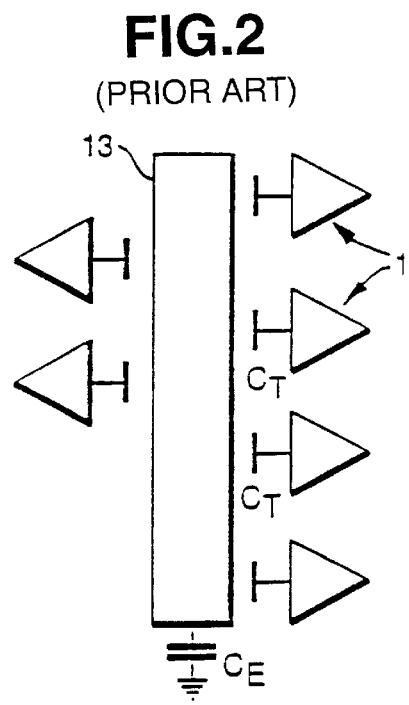
FIG. 2 is a schematic view of a plurality of prior art capacitance transducers surrounding a target.
Figure 3:
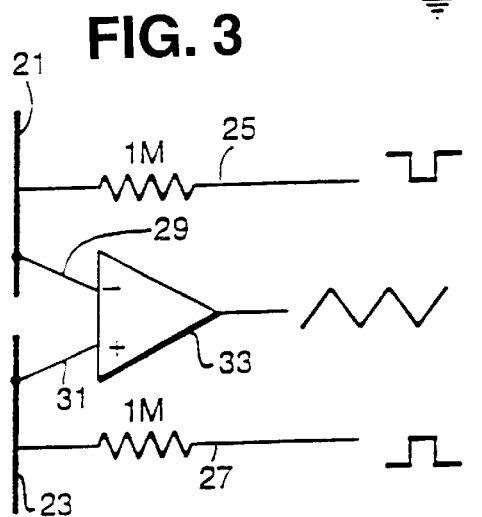
FIG. 3 is a schematic circuit illustrating the principles of the present invention.
Figure 4:
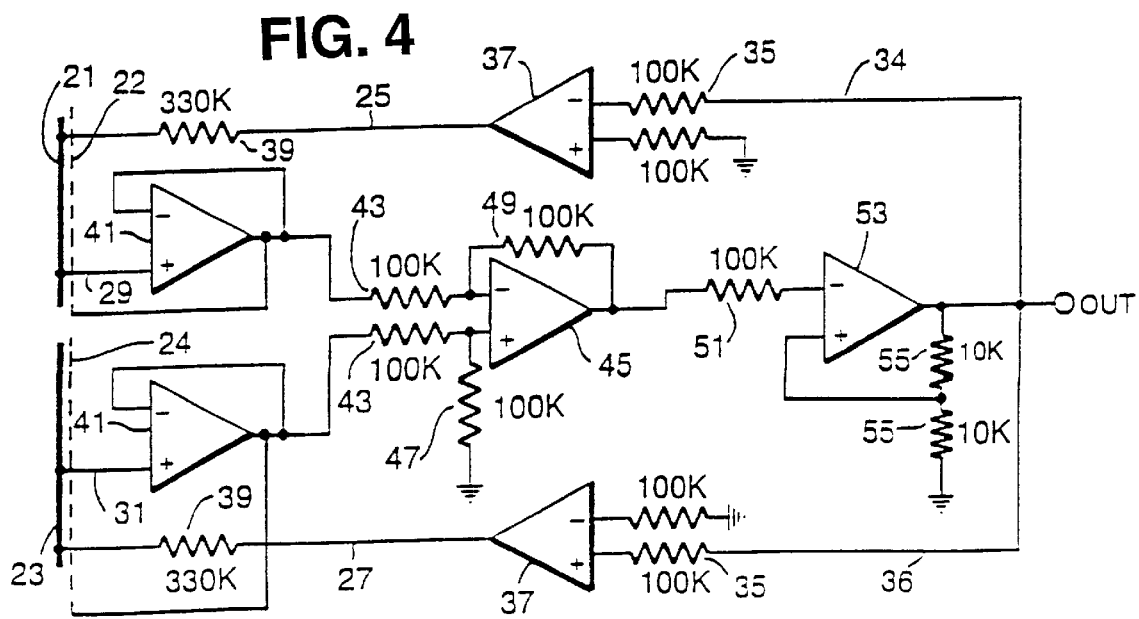
FIG. 4 is a simple circuit diagram illustrating an arrangement of signal application means, processing means and electrodes as found in an embodiment of the present invention.

As can be seen from FIGS. 3 and 4 of the accompanying drawings, a capacitance transducer according to the present invention in its simplest form comprises a first electrode 21, a second electrode 23, an oscillating input 25 to the resistor conected to the first electrode 21, an oscillating input 27 to the resistor connected to the second electrode 23 and connections 29, 31 from the electrodes 21, 23 to processing means comprising an operational amplifier 33, 45. The oscillating inputs 25, 27 to the electrodes 21, 23 are of opposite polarity so that there is no net resultant signal applied to the target (not shown) which could upset neighbouring transducers via cross talk. Clearly, of course, if the electrodes 21, 23 are at different distances to the target, a signal may be left on the target, but this signal will be small if the positions of the two electrodes 21, 23 are controlled carefully to be equivalent.

Figure 6:
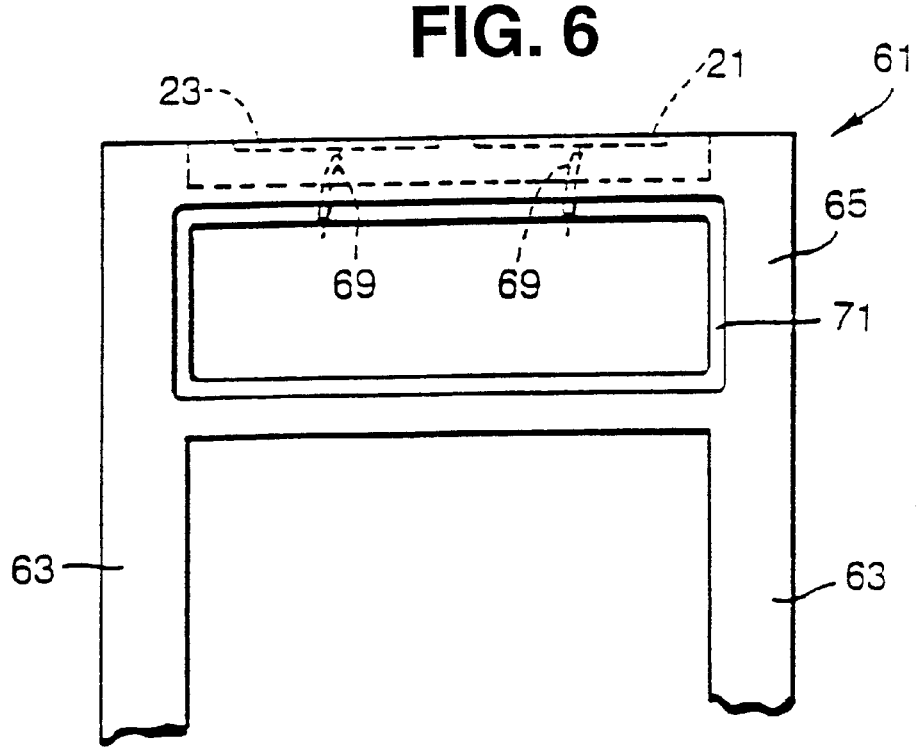
FIG. 6 is a schematic front view of the head shown in FIG. 5.

In a particular embodiment, each electrode 21, 23 is substantially rectangular, the length of each electrode being approximately 20 mm and the width being 14 mm. A separation of approximately 10 mm between the shorter sides of the electrodes 21, 23 is also provided, as shown in FIG. 6. The sizes are, of course, variable, depending upon the application of the capacitance transducer.

As can be seen from FIG. 4, in a particular embodiment the inputs 34,36 pass via 100 kΩ resistors 35 to operational amplifiers 37. One input 34 is fed into the inverting input of its operational amplifier 37 and the other input 36 is fed into the positive input of its operational amplifier 37. As a result, the two inputs 25, 27 are of opposite polarity. Each input 25, 27 is then fed via a 330 kΩ resistor 39 to its respective electrode 21, 23, which is protected by a respective guard ring 22,24. The voltage across each electrode 21, 23 is applied via an operational amplifier 41 with negative feedback and a 100 kΩ resistor 43 to an operational amplifier 45 which subtracts one output from the other. 100 kΩ resistors 47,49 are positioned between the positive input to the amplifier 45 and earth and between the output from the amplifier 45 and the inverting input of the amplifier 45 respectively. The output from the amplifier 45 passes through another 100 kΩ resistor 51 to the inverting input of an amplifier 53, the positive input of which is fed via a potential divider formed by two 10 kΩ resistors 55 from the output of the amplifier 53.

Figure 5:
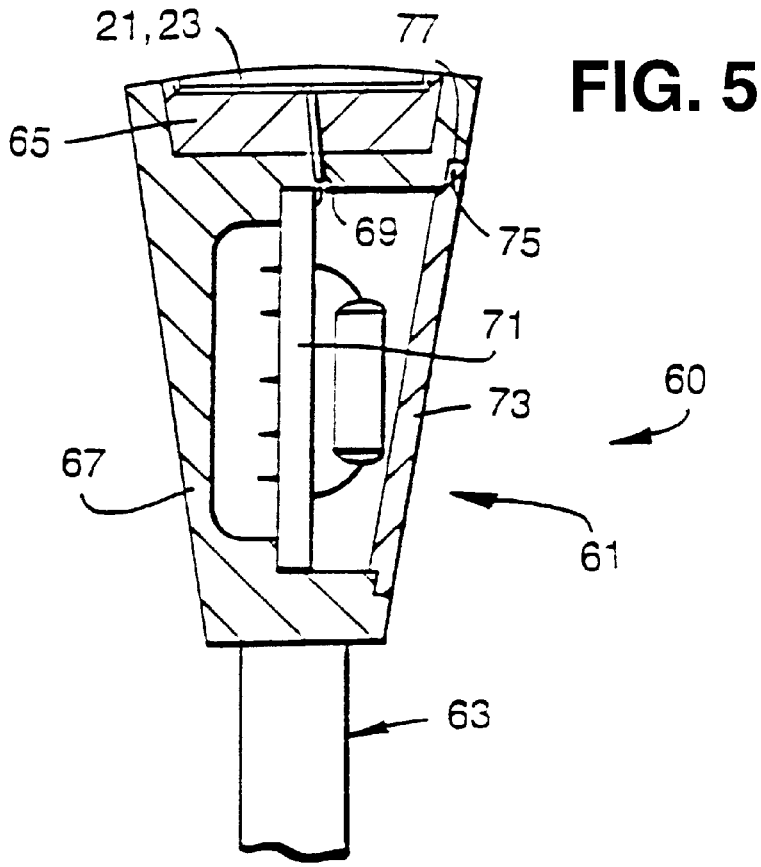
FIG. 5 is a schematic sectional side view of a head of a capacitance transducer according to the present invention.
Figure 7:
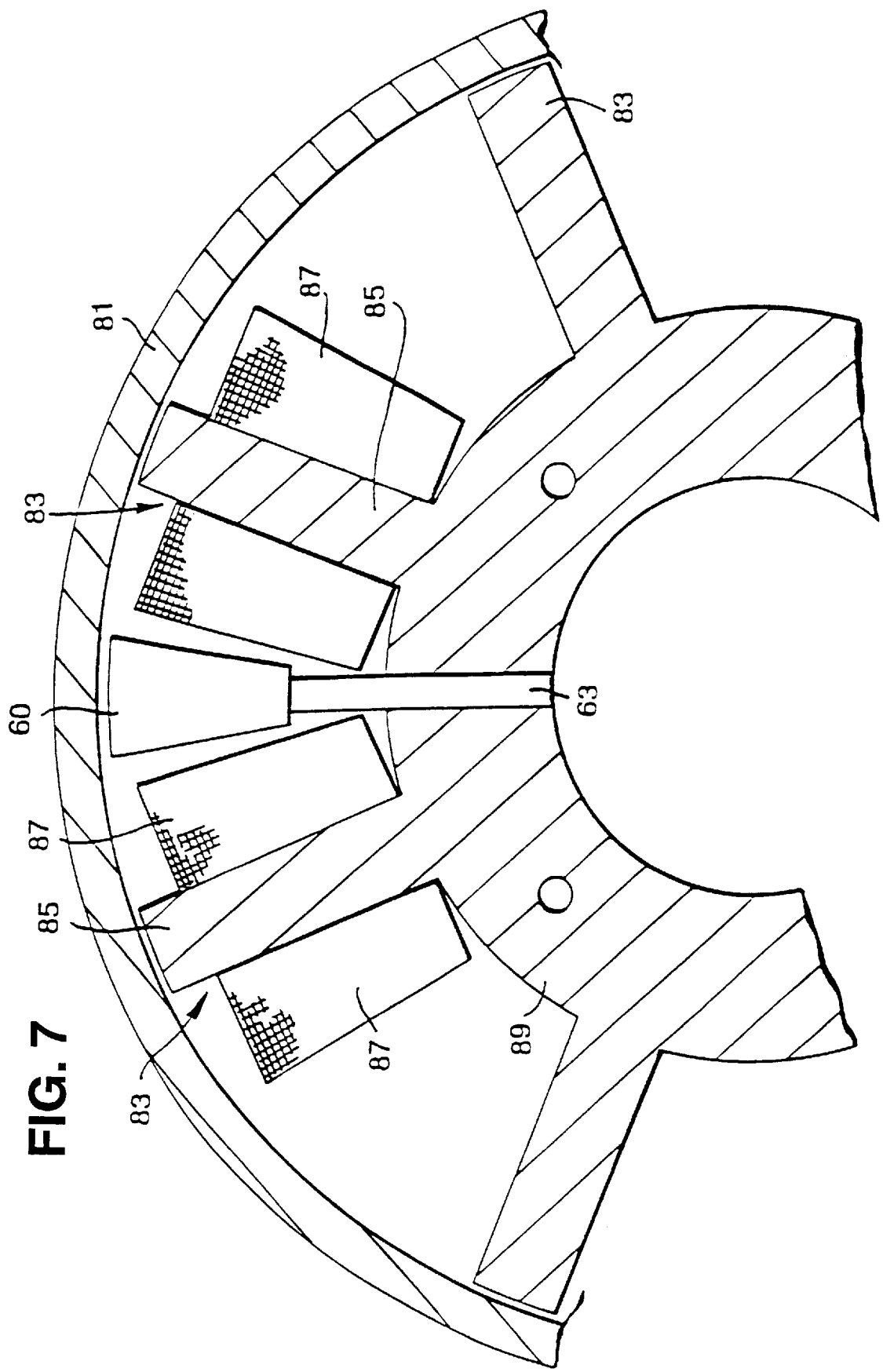
FIG. 7 is a schematic plan view of a portion of a stator and rotor apparatus incorporating a transducer according to the present invention.

With reference to FIGS. 5, 6 and 7 of the accompanying drawings, the capacitance transducer 60 comprises a head 61 and a tail 63. The electrodes 21, 23 are mounted in an epoxy resin (or any other suitable material) insulator 65 at the wider end of the head 61. The electrodes 21, 23 and epoxy resin insulator 65 are mounted in a body 67 of the head 61 and guarded connections 69 extend from the electrodes 21, 23 to a printed circuit board 71 mounted within a cavity in the body 67. The printed circuit board 71 carries the circuitry for applying opposing signals to the respective resistor and electrode 21, 23 combinations and for reacting to voltages received therefrom for processing. A power supply (not shown) is connected to the printed circuit board 71 via the tail 63 of the transducer 60.

A cap 73 overlays the printed circuit board 71 to close the head 61 of the transducer. In this regard, the cap 73 includes side flanges 75 which are received in recesses 77 of the body 67 with a tight fit.

As can be seen in FIG. 7, a capacitance transducer 60 according to the present invention may be incorporated in an apparatus comprising a cylindrical rotor 81 driven about a motor stator (not shown). Electromagnets 83, comprising a plurality of poles 85 carrying coils 87, are included to suspend the rotor 81 about the motor stator to reduce friction losses during rotation of the rotor 81.

The transducer 60 may be provided with two legs 63 (cf. FIG. 6), rather than a single tail 63, which straddle the core 89 of the electromagnets 83 as shown in FIG. 7. The position of the transducer 60 is thereby accurately positioned during assembly of the complete apparatus. Further, by virtue of the transducer 60, the position of the rotor 81 about the motor stator and electromagnets 83 can be accurately determined. In this regard, the rotor 81 may be within a few millimetres (perhaps even 1 mm) of the faces of the poles 85 during use. As a result, the electrodes 21, 23, which are set back relative to the pole faces to ensure that the rotor 81 strikes the pole faces rather than the transducer 60 in the event of a failure, have curved surfaces to conform with the curved inside surface of the rotor 81. Such an apparatus may be an energy storage and conversion apparatus, wherein energy is stored in the rotor 81 as kinetic energy of the rotor 81 by means of the motor stator (not shown) driving the rotor 81 and removed therefrom when the motor stator and rotor 81 act as a generator to withdraw energy.

Although an apparatus has been described wherein the rotor 81 is outside the motor stator, a transducer 60 according to the present invention could alternatively be used in connection with a rotor mounted within a stator or, indeed, in any other appropriate apparatus.

It will of course be understood that the present invention has been described above purely by way of example, and that modifications of detail can be made within the scope of the invention.

We claim:

1. A transducer for providing distance or position information about a target relative to the transducer, the transducer comprising:

a first resistor and a first electrode for forming a first capacitive coupling with the target, a second resistor and a second electrode for forming a second capacitive coupling with the target, means for applying signals of one of opposite phase and of opposite polarity to the respective resistor and electrode combinations, and processing means for processing the voltages appearing across the first and second electrodes to produce an output indicative of one of distance and position of the target relative to the transducer.

2. A transducer as claimed in claim 1, wherein the means for applying signals comprise an oscillator for providing equal and opposite waveforms to be applied to the respective first and second resistor and electrode combinations.

3. A transducer as claimed in claim 1, wherein a head of the transducer carries the first and second electrodes in a first plane and a tail of the transducer substantially perpendicular to the first plane is adapted to connect the transducer to a power source.

4. A transducer as claimed in claim 3, wherein the processing means are mounted in the head of the transducer.

5. A transducer as claimed in claim 4, wherein the processing means are formed on a printed circuit board mounted in the head of the transducer substantially perpendicular to the first and second electrodes.

6. A transducer as claimed in claim 3, wherein the head of the transducer tapers from a wide end carrying the electrodes to a narrow end connected to the tail of the transducer.

7. A transducer as claimed in claim 1, wherein the first and second electrodes are substantially rectangular and mounted in an insulator on an exposed surface of the transducer.

8. A transducer as claimed in claim 1, wherein guard rings are provided around the electrodes.

9. A transducer as claimed in claim 1, wherein the transducer comprises a body and a cap, the cap being removable to facilitate access to the processing means within the body.

10. A transducer as claimed in claim 9, wherein the body and cap of the transducer are made of aluminium.

11. A transducer as claimed in claim 1, wherein the first and second electrodes present a curved face for conforming with a correspondingly curved target.

12. An apparatus comprising a rotor, a stator for driving the rotor and a plurality of electromagnets for supporting the rotor relative to the stator, wherein at least one transducer according to claim 1 is included for providing information about the position of the rotor relative to the stator.

13. An apparatus as claimed in claim 12, wherein the information provided by the transducer is used to control the electromagnets.

14. An apparatus as claimed in claim 12, wherein the rotor is cylindrical and rotates about the stator.

15. An apparatus as claimed in claim 12, wherein the transducer is positioned between poles of the stator or poles of the electromagnets.

16. An apparatus as claimed in claim 12, wherein the electrodes are arranged to lie in a line substantially parallel to the axis of the rotor.

17. An apparatus as claimed in claim 12, wherein the apparatus is an energy storage and conversion apparatus.

18. A transducer for providing distance or position information about a target relative to the transducer, the transducer comprising:

a first resistor and a first electrode for forming a first capacitive coupling with the target, a second resistor and a second electrode for forming a second capacitive coupling with the target, an oscillator applying signals of one of opposite phase and of opposite polarity to the respective resistor and electrode combinations, and a comparator responsive to voltages appearing across the first and second electrodes producing an output indicative of any difference in capacitance coupling between said electrodes and said target, said difference representative of one of distance and position of the target relative to the transducer.

19. An apparatus comprising:

a rotor, a stator for driving the rotor, and a plurality of electromagnets for supporting the rotor relative to the stator, wherein at least one transducer according to claim 19 is included for providing information about the position of the rotor relative to the stator.

\* \* \* \* \*